United States Patent
Robinson

(10) Patent No.: US 8,419,934 B1
(45) Date of Patent: Apr. 16, 2013

(54) FILTER

(75) Inventor: Elwyn Robinson, Victorville, CA (US)

(73) Assignee: Sundance Spas, Inc., Chino, CA (US)

( * ) Notice: Subject to any disclaimer, the term of this patent is extended or adjusted under 35 U.S.C. 154(b) by 523 days.

(21) Appl. No.: 12/609,482

(22) Filed: Oct. 30, 2009

Related U.S. Application Data

(60) Provisional application No. 61/109,781, filed on Oct. 30, 2008.

(51) Int. Cl.
*E04H 4/12* (2006.01)

(52) U.S. Cl.
USPC ... 210/167.12; 210/315; 210/489; 210/493.1; 210/500.1

(58) Field of Classification Search ............ 210/167.12, 210/232, 315, 437, 489, 493.1, 493.2, 493.5, 210/500.1
See application file for complete search history.

(56) References Cited

U.S. PATENT DOCUMENTS

| | | | |
|---|---|---|---|
| 2,979,159 A * | 4/1961 | Pritchard et al. ................. 55/482 |
| 3,349,919 A * | 10/1967 | Royer et al. ................... 210/232 |
| 3,570,675 A | 3/1971 | Pall et al. |
| 3,716,436 A | 2/1973 | Pall et al. |
| 4,104,170 A | 8/1978 | Nedza |
| 4,108,775 A | 8/1978 | Wilkes et al. |
| 4,138,337 A | 2/1979 | Smith |
| 4,233,694 A | 11/1980 | Janosko et al. |
| 4,522,719 A | 6/1985 | Kuwajima et al. |
| 4,540,489 A | 9/1985 | Barnard |
| 4,552,658 A | 11/1985 | Adcock et al. |
| 4,637,837 A | 1/1987 | von Matuschka et al. |
| 4,637,873 A * | 1/1987 | DeSousa et al. ........... 210/167.1 |
| 4,954,255 A | 9/1990 | Müller et al. |
| 5,106,501 A | 4/1992 | Yang et al. |
| 5,180,489 A | 1/1993 | Bourgeois |
| 5,211,846 A | 5/1993 | Kott et al. |
| 5,267,359 A | 12/1993 | Clark |
| 5,279,731 A | 1/1994 | Cook et al. |
| 5,376,278 A | 12/1994 | Salem |
| 5,409,606 A | 4/1995 | Spencer |
| 5,468,382 A | 11/1995 | Cook et al. |
| RE35,410 E | 12/1996 | Adcock et al. |
| 5,972,063 A * | 10/1999 | Dudrey et al. .................. 55/485 |
| 6,066,253 A | 5/2000 | Idland et al. |
| 6,110,248 A * | 8/2000 | Liu ................................ 55/490 |
| 6,143,047 A * | 11/2000 | Jodoin et al. .................... 55/323 |
| 6,283,308 B1 | 9/2001 | Patil et al. |
| 6,383,395 B1 | 5/2002 | Clarke et al. |
| 6,395,167 B1 | 5/2002 | Mattson, Jr. et al. |
| 6,524,411 B2 | 2/2003 | Pulek et al. |
| 6,592,341 B1 | 7/2003 | Olney |

(Continued)

*Primary Examiner* — Fred Prince
(74) *Attorney, Agent, or Firm* — The Webb Law Firm

(57) ABSTRACT

A filter assembly includes an outer filter assembly, the outer filter assembly including an outer filter layer of pleated polyester fabric arranged in a hollow cylindrical shape and first and second end caps for retaining the ends of the outer filter layer, and an inner filter assembly including a hollow cylindrical core having a side wall with a plurality of perforations defined therein, an inner filter layer of meltblown polypropylene disposed around an outer surface of the side wall of the hollow cylindrical core, and first and second end caps. The inner filter assembly is removably received within the outer filter assembly such that the hollow cylindrical core and inner filter layer extend within the hollow cylindrical shape defined by the outer filter layer. The filter assembly is adapted to be mounted in a horizontal orientation within a filtering chamber of a spa device.

18 Claims, 7 Drawing Sheets

U.S. PATENT DOCUMENTS

| | | |
|---|---|---|
| 6,641,637 B2 | 11/2003 | Kallsen et al. |
| 6,702,941 B1 * | 3/2004 | Haq et al. ................ 210/315 |
| 6,751,814 B2 | 6/2004 | Mattson, Jr. et al. |
| 6,854,601 B2 | 2/2005 | Patil |
| 6,962,660 B2 | 11/2005 | Wybo |
| 6,971,125 B2 | 12/2005 | Mattson, Jr. et al. |
| 7,090,772 B2 | 8/2006 | Pearson et al. |
| 7,168,574 B2 | 1/2007 | King |
| 7,172,694 B2 | 2/2007 | Bortnik |
| 7,314,555 B2 | 1/2008 | Koehler et al. |
| 7,331,821 B2 | 2/2008 | Feldman |
| 7,334,274 B2 | 2/2008 | Wang |
| 7,335,299 B2 | 2/2008 | King |
| 7,419,590 B2 | 9/2008 | King et al. |
| 7,425,266 B2 | 9/2008 | Freeman et al. |
| 7,857,974 B2 * | 12/2010 | Jiang ........................ 210/338 |
| 2001/0010297 A1 | 8/2001 | Pulek et al. |
| 2002/0043493 A1 | 4/2002 | Patil |
| 2002/0092810 A1 | 7/2002 | King |
| 2003/0047503 A1 | 3/2003 | Bortnik et al. |
| 2003/0213059 A1 | 11/2003 | Mattson, Jr. et al. |
| 2004/0055939 A1 | 3/2004 | Wybo |
| 2004/0221381 A1 | 11/2004 | Mattson, Jr. et al. |
| 2004/0232059 A1 | 11/2004 | Gustafson et al. |
| 2005/0044619 A1 | 3/2005 | Mattson, Jr. et al. |
| 2005/0055762 A1 | 3/2005 | Wang |
| 2005/0139535 A1 | 6/2005 | King |
| 2005/0183199 A1 | 8/2005 | Mattson, Jr. et al. |
| 2005/0268393 A1 * | 12/2005 | Bergstrom ................ 4/541.1 |
| 2006/0196822 A1 | 9/2006 | Koehler et al. |
| 2006/0292947 A1 * | 12/2006 | LaVietes et al. ............. 442/49 |
| 2007/0241045 A1 | 10/2007 | Kott et al. |
| 2007/0289920 A1 | 12/2007 | Baker, Jr. et al. |
| 2008/0023385 A1 | 1/2008 | Baker, Jr. et al. |
| 2008/0087598 A1 | 4/2008 | King |
| 2008/0223774 A1 | 9/2008 | Chen et al. |

\* cited by examiner

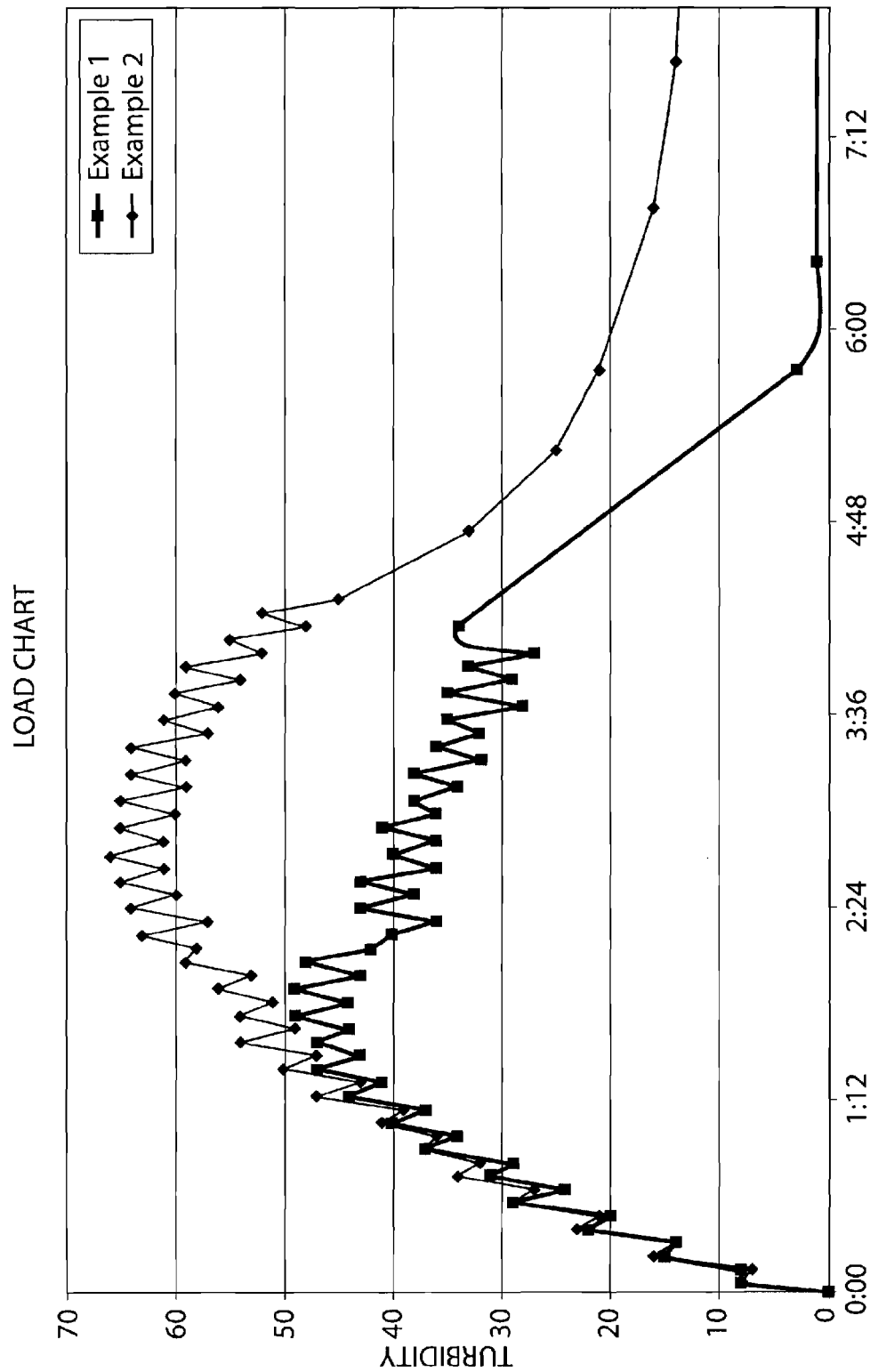

FILTER

CROSS-REFERENCE TO RELATED APPLICATIONS

The present application claims priority from U.S. Provisional Patent Application No. 61/109,781, filed Oct. 30, 2008, which is incorporated herein by reference in its entirety.

BACKGROUND OF THE INVENTION

1. Field of the Invention

The present invention relates generally to a filter. More specifically, the present invention relates to a dual chamber cartridge-type filter for use in a spa tub or similar device that includes an inner filter assembly removably disposed within an outer filter assembly.

2. Description of Related Art

Conventional cartridge type-filter assemblies, for both spa and pool circulation systems, typically feature a layer of pleated fabric filter material arranged in a hollow cylindrical shape around a hollow core of plastic material that features a plurality of perforations or is formed as an open grid, which provides structural support to the fabric filter material. Water passing through the circulation system flows radially into the core through the fabric filter layer, where debris is filtered from the water supply.

Such conventional assemblies are usually made at a small size, such that the filter must be removed from the circulation system for cleaning at frequent intervals in order to prevent clogging. Moreover, while the fabric filter layer is suitable for filtering larger debris and particles from the circulating water, fine particles and other contaminants dissolved within the water are not removed. Further, the core of the filter assembly is not removable from the filter material, which leads to a build up of contaminants at the interface between the fabric filter layer and the core, since the core cannot be removed and separately cleaned from the fabric filter.

SUMMARY OF THE INVENTION

The present invention addresses the above-detailed problems in conventional spa filters by providing a cartridge-type filter assembly suitable for use in water circulation systems for spas, but also capable of being used in circulation systems for other purposes, such as in a circulation system for a pool. The filter assembly has a larger overall length and diameter so as to contain more overall filtering material than conventional filters. The filter assembly also contains an inner filter assembly that can be removed from an outer filter assembly for separate cleaning or replacement, so as to prevent a build-up of contaminants between the outer fabric filter and the core. The inner filter assembly also contains an inner filter layer for filtering fine particles and contaminants from the circulating water. Thus, the effectiveness of the filter assembly as compared to conventional designs is increased and the filter assembly has a longer operational lifetime. Moreover, since the inner filter assembly is removable, the inner and outer filter assemblies may be replaced, thus further lowering replacement costs.

According to an embodiment of the present invention, a filter assembly is provided. The filter assembly includes an outer filter assembly, the outer filter assembly including an outer filter layer of pleated polyester fabric defining a first end and a second end; and an inner filter assembly, the inner filter assembly including an inner filter layer of meltblown polypropylene. The inner filter assembly is operably associated with the outer filter assembly such that the outer filter layer and the inner filter layer extend along a common flow path.

The outer filter assembly is arranged in a hollow cylindrical shape. The outer filter assembly further includes a first end cap for retaining the first end of the outer filter layer, and a second end cap for retaining the second end of the outer filter layer. The inner filter assembly further includes a hollow cylindrical core having a side wall and defining a first end and a second end and the inner filter layer is disposed around an outside surface of the sidewall of the hollow cylindrical core. The side wall of the inner filter assembly has a plurality of perforations defined therein. The inner filter assembly further includes a first end cap disposed on the first end of the hollow cylindrical core and a second end cap disposed on the second end of the hollow cylindrical core. The inner filter layer of meltblown polypropylene has a longitudinal length of 18 inches, an outer diameter of 4.5 inches, an annular thickness of 0.5 inches and a weight of 1.8 grams per square inch of lateral surface area. The filter assembly is adapted to be mounted in a horizontal orientation within a filtering chamber of a spa device.

The outer filter layer of pleated polyester fabric is arranged in a hollow cylindrical shape and the outer filter assembly further includes a first end cap for retaining the first end of the outer filter layer, and a second end cap for retaining the second end of the outer filter layer. The inner filter assembly includes a hollow cylindrical core having a side wall with a plurality of perforations defined therein and defining a first end and a second end, the inner filter layer being disposed around an outer surface of the side wall of the hollow cylindrical core, a first end cap disposed on the first end of the hollow cylindrical core, and a second end cap disposed on the second end of the hollow cylindrical core. The inner filter assembly is removably received within the outer filter assembly such that the hollow cylindrical core and inner filter layer extend within the hollow cylindrical shape defined by the outer filter layer such that the common flow path is a radial flow path extending from the outside of the outer filter layer to an interior of the hollow cylindrical core. The filter assembly is adapted to be mounted in a horizontal orientation within a filtering chamber of a spa device. The inner filter layer of meltblown polypropylene has a longitudinal length of 18 inches, an outer diameter of 4.5 inches, an annular thickness of 0.5 inches and a weight of 1.8 grams per square inch of lateral surface area. The second end cap of the inner filter assembly includes a beveled coupling surface along an inner diameter of the second end cap. The second end cap of the outer filter assembly includes a recessed portion that receives the second end cap of the inner filter assembly in a mating engagement.

According to another embodiment of the present invention a spa tub is provided. The spa tub includes a basin including a filtering chamber; a circulation system including at least one inlet in fluid communication with the filtering chamber of the basin, at least one outlet in fluid communication with the basin and a circulation pump for circulating liquid from the at least one inlet to the at least one outlet; and a filter assembly disposed within the filtering chamber of the basin and connected to the at least one inlet of the circulation system. The filter assembly includes an outer filter assembly, the outer filter assembly including an outer filter layer of pleated polyester fabric defining a first end and a second end; and an inner filter assembly, the inner filter assembly including an inner filter layer of meltblown polypropylene. The inner filter assembly is operably associated with the outer filter assembly, such that the outer filter layer and the inner filter layer extend along a common flow path.

The outer filter layer of pleated polyester fabric is arranged in a hollow cylindrical shape and the outer filter assembly further includes a first end cap for retaining the first end of the outer filter layer, and a second end cap for retaining the second end of the outer filter layer. The inner filter assembly includes a hollow cylindrical core having a side wall with a plurality of perforations defined therein and defining a first end and a second end, the inner filter layer being disposed around an outer surface of the side wall of the hollow cylindrical core, a first end cap disposed on the first end of the hollow cylindrical core, and a second end cap disposed on the second end of the hollow cylindrical core. The inner filter assembly is removably received within the outer filter assembly such that the hollow cylindrical core and inner filter layer extend within the hollow cylindrical shape defined by the outer filter layer, such that the common flow path is a radial flow path extending from the outside of the outer filter layer to an interior of the hollow cylindrical core. The filter assembly is mounted in a horizontal orientation within the filtering chamber of the basin and the at least one inlet of the circulation system includes two inlets connected to the first end cap of the outer filter assembly and the second end cap of the inner filter assembly. The inner filter layer of meltblown polypropylene has a longitudinal length of 18 inches, an outer diameter of 4.5 inches, an annular thickness of 0.5 inches and a weight of 1.8 grams per square inch of lateral surface area. The second end cap of the inner filter assembly includes a beveled coupling surface along an inner diameter of the second end cap. The second end cap of the outer filter assembly includes a recessed portion that receives the second end cap of the inner filter assembly in a mating engagement. The at least one outlet of the circulation system includes at least one jet nozzle attached to the basin and at least one waterfall formed within the basin.

Further details and advantages of the invention will become clear upon reading the following detailed description in conjunction with the accompanying drawing figures, wherein like parts are designated with like reference numerals throughout.

BRIEF DESCRIPTION OF THE DRAWINGS

FIG. 7 depicts a load chart comparing a prior art filter and a filter assembly according to an embodiment of the present invention.

DETAILED DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
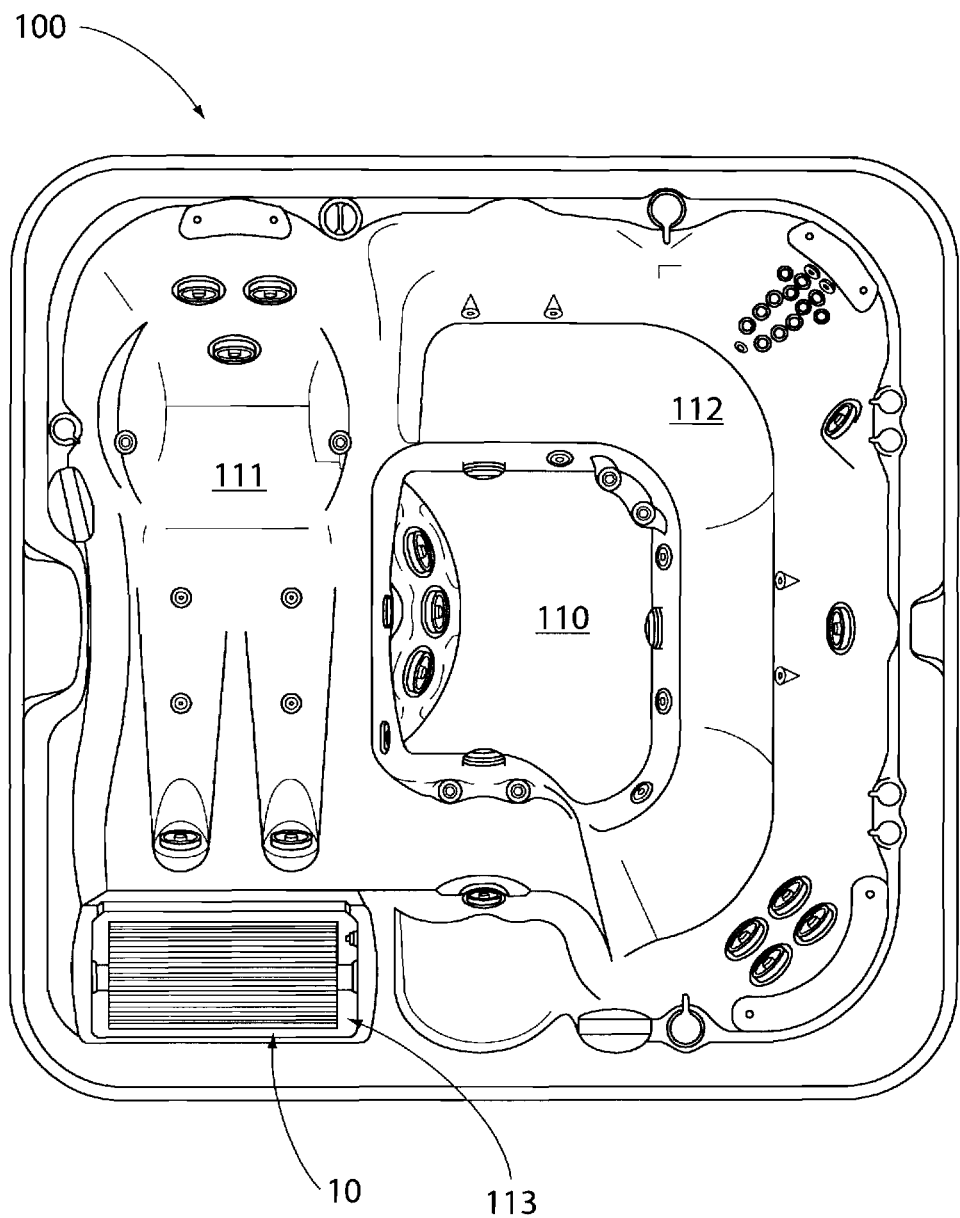
FIG. 1 depicts a top plan view of a spa tub having a filter assembly, according to an embodiment of the present invention.

With reference to FIG. 1, a spa tub 100 is shown that includes a cartridge-type filter assembly 10 for filtering and cleaning the water contained within the tub 100 as the water is being circulated. As shown, the spa tub 100 includes a basin 110 that holds a volume of circulating water and is large enough to accommodate one or more persons therein. The basin 110 includes a reclined seating area 111, on which a person may sit with his/her feet and legs in a reclined position, as well as a bench seating area 112, upon which one or more persons may sit. The basin also includes a plurality of jet nozzles of varying types and arranged in varying configurations around the basin 110. Water is pumped into the basin through the jet nozzles to create a massaging or therapeutic spray of water into basin 110. The basin 110 may also include one or more waterfalls or other features that also dispense circulated water into the basin 110. The spa tub 100 also includes a filter chamber 113 located beneath or outside the basin 110 and in fluid communication with the upper portion of the basin 110. As water is circulated into the basin from the jet nozzles and/or waterfalls, the water level in the basin 110 will rise until it reaches an outlet to the filter chamber 113, at which time the water will flow into the filter chamber 113, which houses the filter assembly 10 in a horizontal orientation. It is to be appreciated that the spa tub 100 shown in FIG. 1 is of an exemplary configuration only and may be of any suitable configuration so long as it includes a filter chamber 113 able to accommodate the filter assembly 10.

Figure 2:
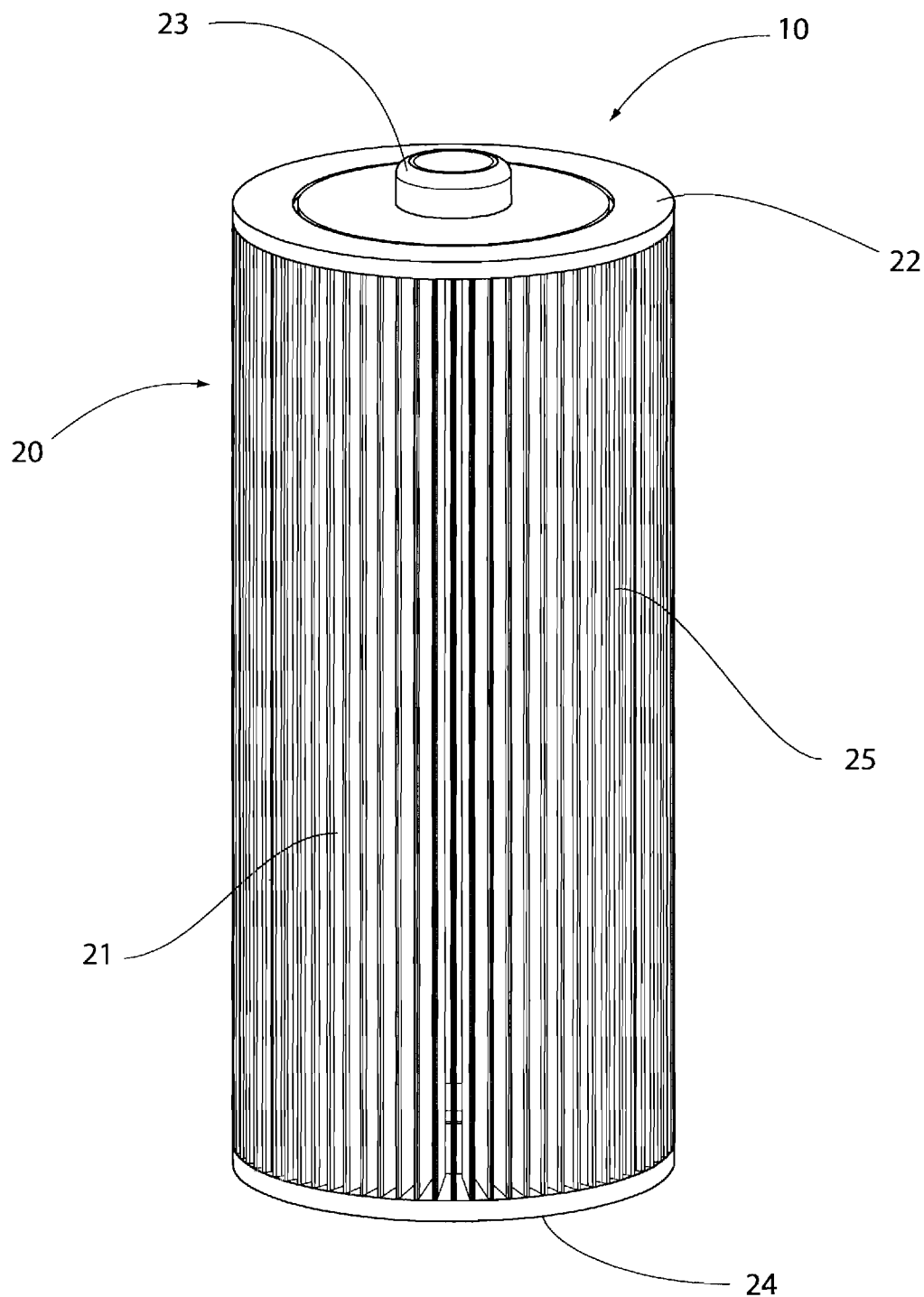
FIG. 2 depicts a side view of the filter assembly, according to an embodiment of the present invention.
Figure 3:
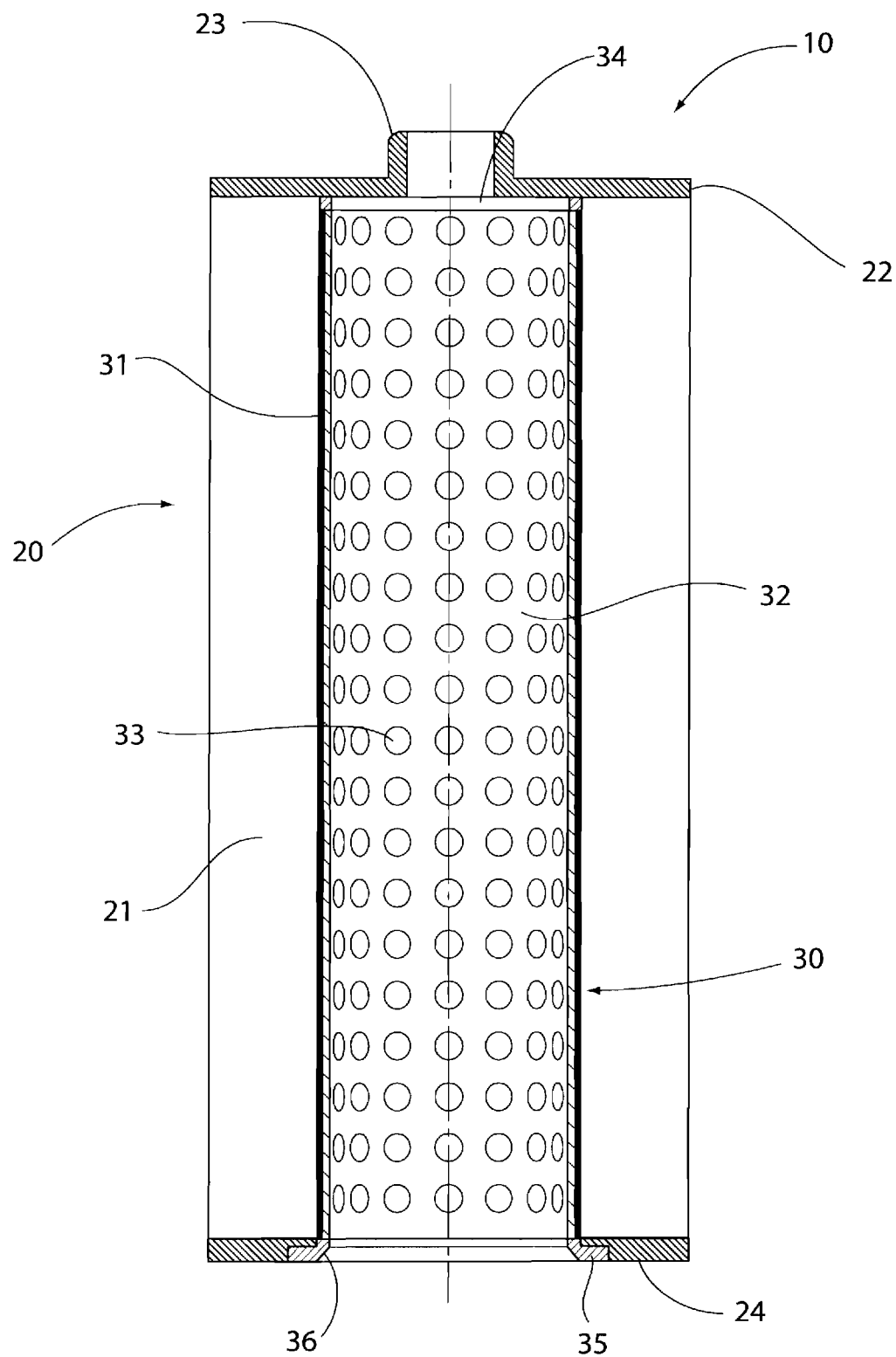
FIG. 3 depicts a cross-sectional side view of the filter assembly.
Figure 4:
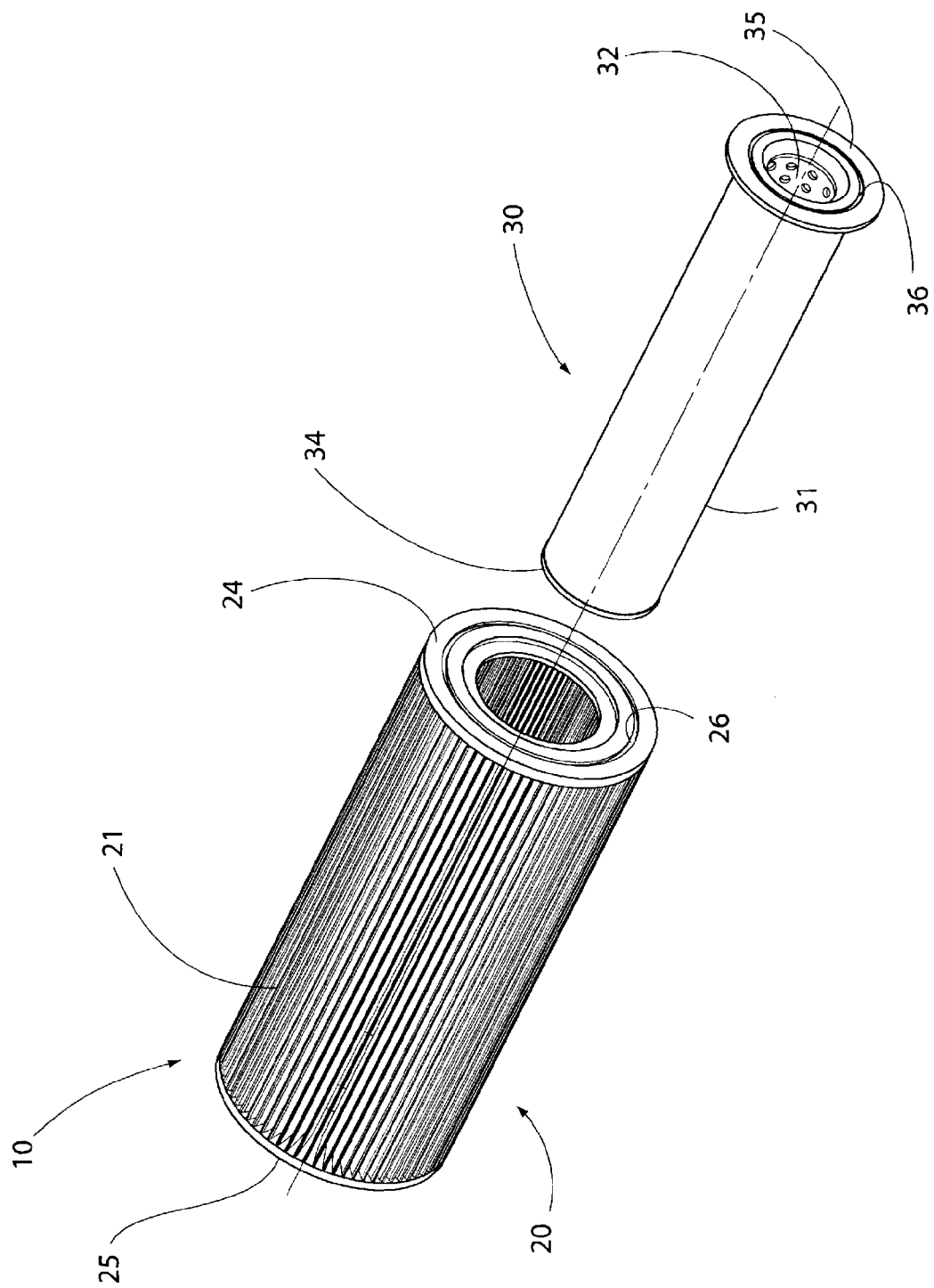
FIG. 4 depicts a perspective view of the filter assembly with the inner filter assembly removed from the outer filter assembly.

With reference to FIGS. 2-4, the filter assembly 10 includes an outer filter assembly 20 and an inner filter assembly 30. As shown in FIGS. 2 and 3, the outer filter assembly includes an outer filter layer 21 made up of a pleated polyester fabric arranged in a hollow cylindrical shape. The fabric of the outer filter layer 21 may be formed as such, or may be formed from a sheet of fabric material, which is pleated and subsequently joined at the edges to form a longitudinal joint, according to techniques known to those of ordinary skill in the art. As stated above, the outer filter layer 21 is arranged in a hollow cylindrical shape defining a first end and a second end. A first end cap 22 is disposed on the first end of the outer filter layer 21 and retains the outer filter layer 21 in its cylindrical shape. To that end, the first end cap may include an annular groove (not shown) in a surface thereof that is capable of receiving the first end of the outer filter layer 21. The first end cap 22 also includes a coupling portion 23 extending from another surface thereof for attaching the filter assembly 10 to a water circulation system 200, shown in FIG. 5. As shown, the first end cap 22 has a disc shape with the coupling portion 23 extending therefrom along a longitudinal axis of the outer filter assembly 20. A hole extends through the coupling portion 23 and the first end cap 22, such that the hollow interior of the outer filter assembly 20 is in fluid communication with the exterior of the filter assembly 10 through the first end cap 22. A second end cap 24 is disposed on the second end of the outer filter layer 21 and retains the outer filter layer 21 in its cylindrical shape. To that end, the second end cap 24 may also include an annular groove (not shown) in a surface thereof that is capable of receiving the second end of the outer filter layer 21. The second end cap 24 has an annular shape and a recessed flange portion 26. A plurality of bands may be provided about the outer circumference of the outer filter layer 21 for retaining the outer filter layer in a cylindrical shape.

As shown in FIGS. 3 and 4, the inner filter assembly 30 includes a hollow cylindrical core 32 having a sidewall with a plurality of perforations 33 and defining a first end and a second end. The perforations 33 place the hollow interior of the core 32 in fluid communication with the exterior surface of the sidewall. An inner filter layer 31 of meltblown polypropylene (indicated by the solid black layer shown in FIG. 3) is disposed about the exterior surface of the sidewall of the hollow cylindrical core 32. A first end cap 34 is disposed on the first end of the core 32 and inner filter layer 31. The first end cap 34 has an annular shape and has a diameter only slightly larger than the diameter of the core 32, such that the first end cap can be fit over the first end of the core 32. A second end cap 35 is disposed on the second end of the core 32 and inner filter layer 31. The second end cap 35 has an annular shape with an inner diameter approximately equal to the diameter of the core 32 and inner filter layer 31, such that the second end of the core 32 fits within the second end cap 35. The second end cap 35 also includes a beveled coupling surface 36 along its inner diameter, which is able to receive a pipe conduit therein for connecting the second end of the filter assembly with the water circulation system 200. The present design is adapted so that the inner filter layer 31 is adapted to filter out smaller particles than the outer filter layer 21.

As shown in FIGS. 3 and 4, the inner filter assembly 30 is removably received within the outer filter assembly 20, such that the hollow cylindrical core 32 and the inner filter layer 31 extend within the hollow cylindrical shape defined by the outer filter layer 21. To assemble the filter assembly 10, the inner filter assembly 30 is slid into and through the outer filter assembly 20 until the first end cap 34 of the inner filter assembly engages the first end cap 22 of the outer filter assembly 20. The first end cap 22 of the outer filter assembly 20 may further include a recessed flange portion (not shown), so as to create a mating engagement between the first end cap 34 of the inner filter assembly 30 and the first end cap 22 of the outer filter assembly 20. Likewise, the outer diameter of the second end cap 35 of the inner filter assembly 30 is sized so as to fit within the recessed flange portion 26 defined within the second end cap 24 of the outer filter assembly 20. The mating engagements discussed above serve to secure the inner filter assembly 30 from jarring and radial movement, so as to maintain alignment of the inner 30 and outer 20 filter assemblies.

With reference to FIGS. 3 and 4, when assembled, the inner 30 and outer 20 filter assemblies define a radial flow path from the exterior of the filter assembly 10 through the outer filter layer 21, which filters particles and debris from the circulating water, and subsequently through the inner filter layer 31, which filters fine particles and contaminants from the circulating water. Filtered water then passes into the hollow interior of the cylindrical core 32 via the perforations 33, and out of the filter assembly 10 at both ends via the first end cap 22 of the outer filter assembly 20 and the second end cap 35 of the inner filter assembly 30. It is to be appreciated, then, that filter assembly 10 is a dual chamber cartridge that performs two separate filtrations on water circulating through the spa tub 100 with the cylindrical core 32 and end caps 22, 24, 34, 35 providing structural support to the flexible filter layers 21, 31.

As discussed above, the outer filter layer 21 is made from pleated polyester fabric. For instance, the outer filter layer may be 3 oz. REEMAY® fabric, manufactured by Fiberweb plc. The inner filter layer 31 is made from meltblown polypropylene. The cylindrical core 32 is made from polyvinyl chloride and the end caps 22, 24, 34, 35 are made from polyurethane. It is to be appreciated, however, that the components and filter layers of the filter assembly 10 may be made from any material known to be suitable to those of ordinary skill in the art. According to an embodiment of the present invention, the filter assembly 10 has a longitudinal length of approximately 19 inches and an outer diameter of approximately 8.5 inches. The outer filter layer 21 has a longitudinal length of approximately 18.25 inches and defines a hollow interior with a diameter of approximately 4.5 inches. The inner filter assembly 30 has an overall longitudinal length of approximately 18.75 inches. The inner filter layer 31 has a longitudinal length of approximately 18 inches, an outer diameter of approximately 4.5 inches, to match the inner diameter of the outer filter layer 21, a thickness of the inner filter layer 31 is approximately 0.5 inches and the weight of the inner filter layer 31 is approximately 1.8 grams per square inch of lateral surface area, i.e, per square inch of meltblown polypropylene material having a thickness of 0.5 inches. The cylindrical core 32 has an inner diameter of approximately 3 inches.

It is to be appreciated that due to the overall large size of the filter assembly 10 and pleated outer filter layer 21, a large amount of filtering material is available for filtering water circulating through the spa tub 100, thus giving the filter assembly 10 a longer operational lifetime. The filter assembly 10 is removable from the spa tub 100, such that the outer filter layer 21 may be sprayed with water to remove any debris trapped thereon. Further, because the inner filter assembly 30 is removable from the outer filter assembly 20, the inner filter layer 21 may be separately cleaned and disinfected, thus prolonging the operational lifetime of the filter assembly. Alternatively, the filter assembly 10 may be fully sealed on both ends so that the outer 20 and inner 30 filter assemblies cannot be separated. According to an embodiment of the present invention, the filter assembly 10 has an operational lifetime of approximately one year. According to another embodiment of the present invention, the outer filter assembly 20 has an operational lifetime of approximately 18 months while the inner filter assembly 30 has an operational lifetime of approximately 6 months.

Figure 5:
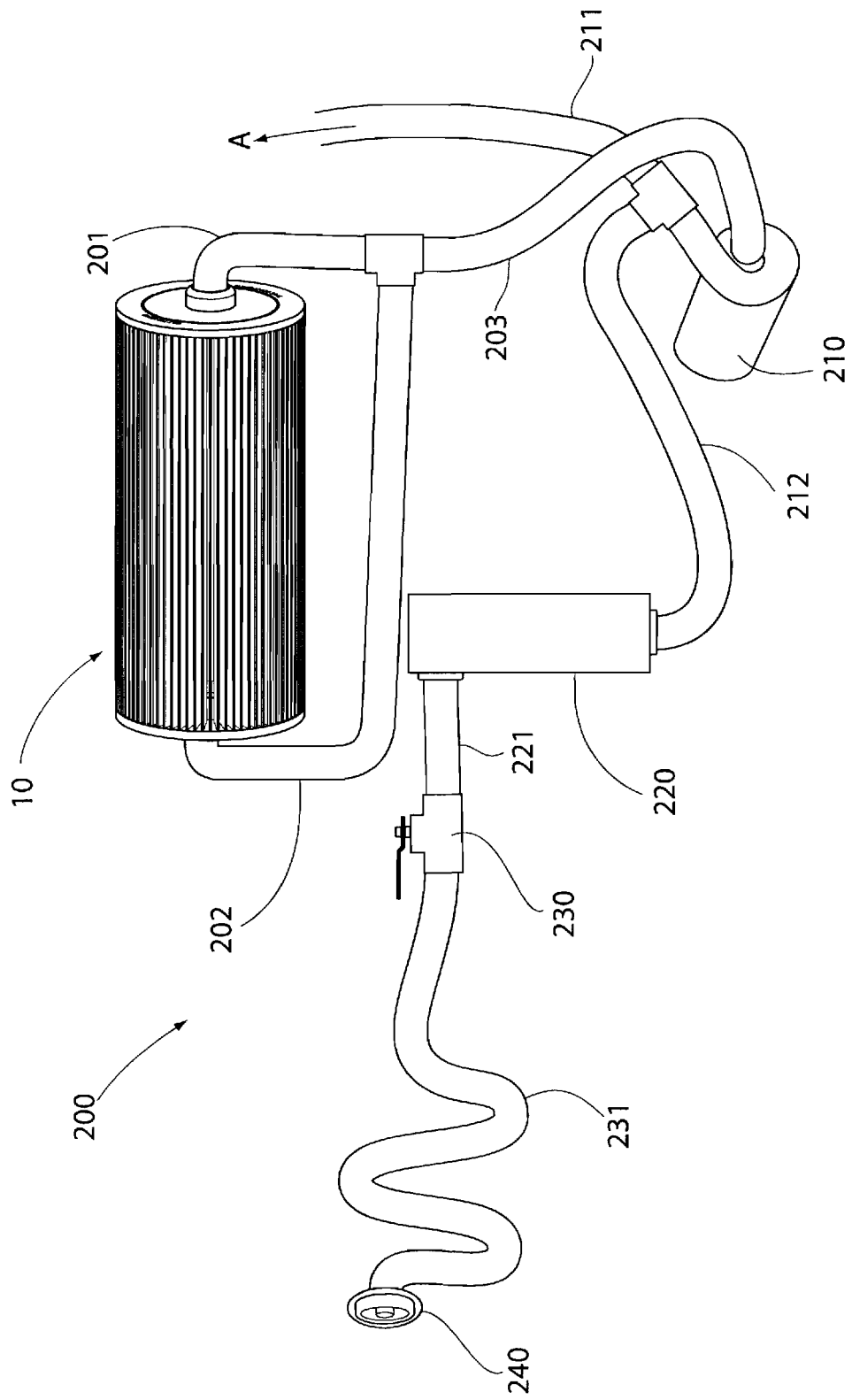
FIG. 5 depicts a schematic of a water circulation system for a spa tub incorporating the filter assembly according to an embodiment of the present invention.

With reference to FIG. 5, a schematic view of a water circulation system 200 of the spa tub 100 is shown. The water flowing from the basin 110 first passes into the filter chamber 113, as discussed above with reference to FIG. 1. Due to pressure within the filter chamber 113, water is then caused to flow into the filter assembly 10 in a radial path through the outer filter layer 21, where larger debris and particles are filtered from the water and subsequently through the inner filter layer 31, where fine particles and contaminants are additionally filtered from the water. The filtered water then passes into the hollow interior of the core 32 via the perforations 33 and out of the filter assembly 10 via the end caps 22, 35 on either end of the filter assembly. A pair of filter outlet conduits 201, 202 are coupled to the filter assembly 10, at both ends thereof, via coupling to the pipe coupling 23 of the first end cap 22 of the outer filter assembly 20 and the beveled coupling surface 36 of the second end cap 35. The filter outlet conduits 201, 202 are coupled to opposing ends of the filter assembly 10 such that the filter assembly 10 is removable from the circulation system 200 and the filter chamber 113 for cleaning, maintenance, and replacement.

Filtered water flows through the outlet conduits 201, 202, which are joined at a pump inlet conduit 203 and to a circulation pump 210 via the pump inlet conduit 203. The circulation pump 210 is responsible for controlling the circulation of water into the basin 110 via both the jet nozzles and waterfalls or similar features. Filtered water directed to the basin 110 and passing through one or more waterfalls or similar features is pumped by the circulation pump 210 through a pump outlet conduit 211 directly to the waterfall, as indicated by arrow A. Filtered water directed to the basin 110 and passing through the jet nozzles is first directed to a water heater 220 via a pump outlet conduit 212, branching away from the pump outlet conduit 211. The heater 220 operates to heat the filtered water to a desired temperature before the water is directed through the jet nozzles. Filtered, heated water is then directed through a conduit 221 to a flow switch 230 for controlling the flow of water into the basin 110 via the jet nozzles. After passing through the flow switch 230, the water passes through a conduit 231 to one or more outlets 240, which are coupled to the jet nozzles, which direct the water into the basin 110, according to techniques known to those of ordinary skill in the art. It is to be appreciated that while the filter assembly 10 has been described as being incorporated into a water circulation system 200 for a spa tub 100, the filter assembly 10 could be adapted to filter water in other circulation systems, for instance, the circulation system for a pool.

Further features of the present invention will be described with reference to specific Examples discussed below:

EXAMPLE 1

A filter assembly measuring 19 inches in length and 8.5 inches in diameter according to the prior art is provided with a filter including three layers of pleated material. The upper layers are suitable for trapping large particles from the water while the lower layers are suitable for trapping smaller particles from the water. Such a filter is manufactured by Sundance Spas, Inc., the assignee of the present application, as the MICROCLEAN PLUS™ filter (Sundance Spas Item #6540-507).

The filter assembly was placed in a system similar to the system discussed above with reference to FIG. 5. The circulation pump was set to an output level of 60 gallons per minute without any restriction. The actual flow rate and pressure of the water through the system were then measured according to varying diverted flows between the waterfall and the jet nozzles. For an actual flow of 31 GPM within the system the pressure drop in the system attributable to the filter assembly was negligible.

Figure 6:
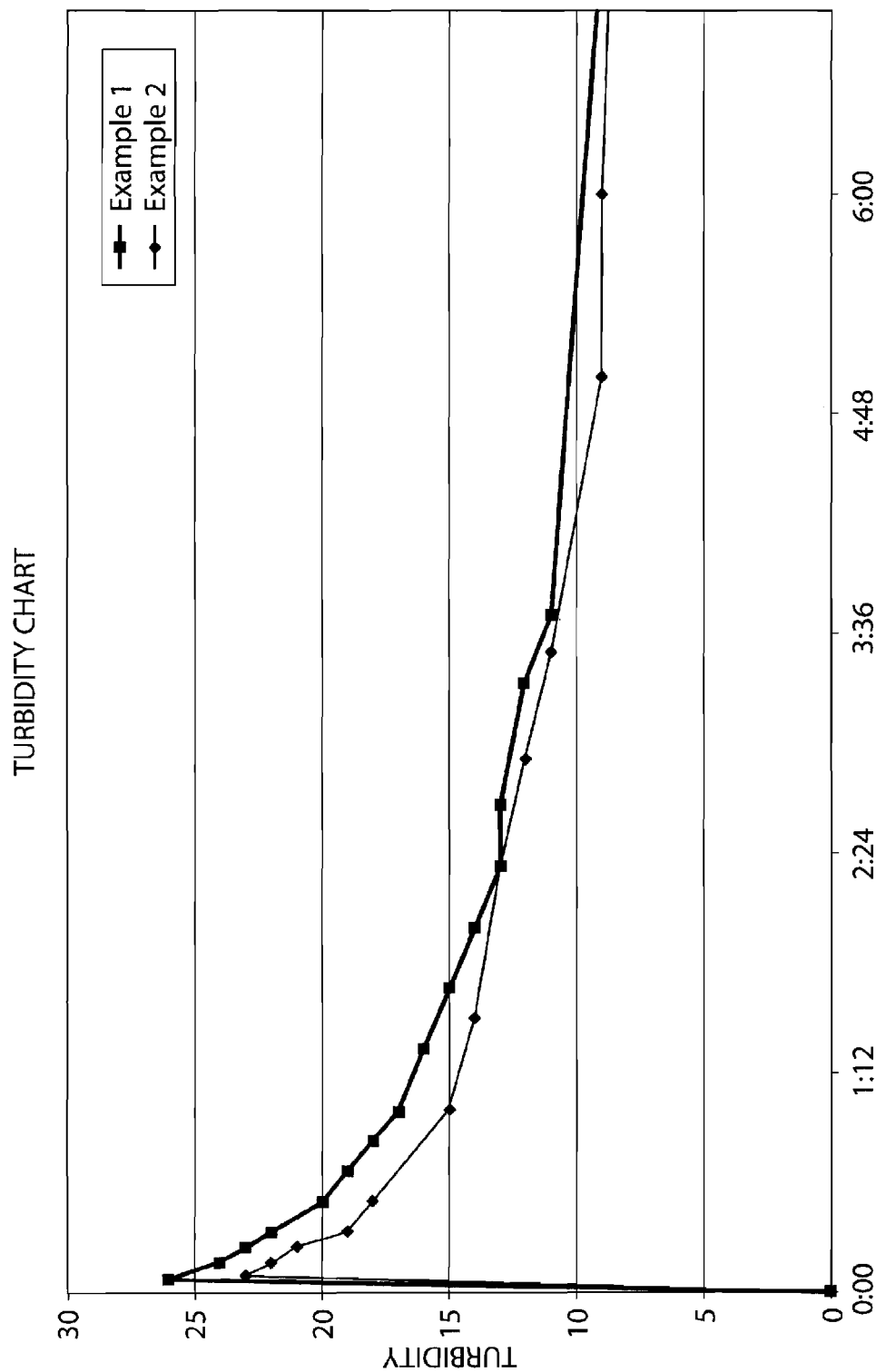
FIG. 6 depicts a turbidity chart comparing a prior art filter and a filter assembly according to an embodiment of the present invention.

During a turbidity test the filter assembly, according to the prior art, was left running while 30 grams of silica sand were dumped into 40 gallons of water. The filter was then operated with water running through the filter assembly until the filter became loaded with sand. During the test, the turbidity levels of the water were checked every five to ten minutes. The measured turbidity level of the water over time as the water was continually filtered by the filter assembly is shown in FIG. 6 by the line having square-shaped data points. This test demonstrates the effectiveness and operability of the filter, as the filter should steadily continue to reduce turbidity in the water until the reading reaches zero.

During a load test the filter assembly, according to the prior art, was left running in 40 gallons of water. Initially, 30 grams of silica sand were added to the water. Thereafter, another five grams of silica sand were added to the water every 20 minutes. This test demonstrates the load capacity of the filter and how the filter cleans over time. The curve will arc upwards as the filter continues to clean. Once the arc begins a downward trend, the filter has reached its capacity and has started to load up. The measured turbidity level of the water over time during the load test as the water was continually filtered by the filter assembly is shown in FIG. 7 by the line having square-shaped data points.

EXAMPLE 2

A filter assembly according to the present invention measuring 19 inches in length and 8.5 inches in diameter is provided with an outer filter layer of 3 oz. pleated polyester fabric and an inner filter layer of meltblown polypropylene having a length of 18 inches, an outer diameter of 4.5 inches, an annular thickness of 0.5 inches.

The filter assembly was placed in a system similar to the system discussed above with reference to FIG. 5. The circulation pump was set to an output level of 60 gallons per minute without any restriction and the filter assembly was operated for 15 hours. The actual flow rate and pressure of the water through the system were then measured according to varying diverted flows between the waterfall and the jet nozzles. For an actual flow of 31 GPM the pressure drop in the system attributable to the filter assembly was approximately 0.37 psi.

During a turbidity test the filter assembly, according to the above embodiment of the present invention, was left running while 30 grams of silica sand were dumped into 40 gallons of water. The filter was then operated with water running through the filter assembly until the filter became loaded with sand. During the test, the turbidity levels of the water were checked every five to ten minutes. The measured turbidity level of the water over time as the water was continually filtered by the filter assembly is shown in FIG. 6 by the line having diamond-shaped data points. This test demonstrates the effectiveness and operability of the filter, as the filter should steadily continue to reduce turbidity in the water until the reading reaches zero. As can be appreciated from FIG. 6, the filter assembly according to the present invention is slightly more effective at removing particles from the water than the prior art filter of Example 1.

During a load test the filter assembly, according to the above embodiment of the present invention, was left running in 40 gallons of water. Initially, 30 grams of silica sand were added to the water. Thereafter, another five grams of silica sand were added to the water every 20 minutes. This test demonstrates the load capacity of the filter and how the filter cleans over time. The curve will arc upwards as the filter continues to clean. Once the arc begins a downward trend, the filter has reached its capacity and has started to load up. The measured turbidity level of the water over time during the load test as the water was continually filtered by the filter assembly is shown in FIG. 7 by the line having diamond-shaped data points. As can be appreciated from FIG. 7, the filter assembly, according to the present invention, was able to filter the water for a longer period of time before clogging and demonstrated a higher load capacity than the prior art filter of Example 1.

EXAMPLE 3

A filter assembly according to the present invention measuring 19 inches in length and 8.5 inches in diameter is provided with an outer filter layer of 3 oz. pleated polyester fabric and an inner filter layer of meltblown polypropylene having a length of 18 inches, an outer diameter of 4.5 inches, an annular thickness of 0.5 inches and a weight of 1.8 grams per square inch of lateral surface area. The weight per square inch of the meltblown polypropylene material in the inner filter layer according to Example 3 was reduced from the weight per square of the meltblown polypropylene material in the inner filter layer according to Example 2 while the other dimensions, including the annular thickness, remained the same.

The filter assembly was placed in a system similar to the system discussed above with reference to FIG. 5. The circulation pump was set to an output level of 60 gallons per minute without any restriction. The actual flow rate and pressure of the water through the system were then measured according to varying diverted flows between the waterfall and the jet nozzles. For an actual flow of 31 GPM the pressure drop in the system attributable to the filter assembly was approximately 0.05 psi.

While not specifically tested, it is believed that the filter assembly, according to the embodiment of Example 3, will perform in a similar manner to the filter assembly, according to the embodiment of Example 2, in the turbidity and load tests. Therefore, by reducing the amount of meltblown polypropylene material in the inner filter layer and, therefore, the weight of material in the inner filter layer, the filter assembly of Example 3 was able to maintain or improve upon the filtering performance of the prior art filter assembly while causing significantly less pressure loss in the system as compared to the filter assembly of Example 2. A low pressure drop results in a longer operational lifespan for the inner filter. Accordingly, the embodiment of the present invention, according to Example 3, has a longer lifespan than the embodiment, according to Example 2, and maintains the same advantages over the prior art as discussed above. According to the embodiment of Example 3, the inner filter has an operational lifespan of approximately 6 months.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only, and not limiting as to the scope of the invention, which is to be given the full breadth of the appended claims and any and all equivalents thereof.

The invention claimed is:

1. A filter assembly, comprising:
an outer filter assembly, the outer filter assembly including an outer filter layer of pleated polyester fabric defining a first end and a second end; and
an inner filter assembly, the inner filter assembly including an inner filter layer of meltblown polypropylene,
wherein the inner filter assembly is operably associated with the outer filter assembly such that the outer filter layer and the inner filter layer extend along a common flow path, and
wherein the filter assembly is adapted to be mounted in a horizontal orientation within a filtering chamber of a spa device.

2. The filter assembly according to claim 1, wherein the outer filter assembly is arranged in a hollow cylindrical shape.

3. The filter assembly according to claim 1, wherein the outer filter assembly further comprises a first end cap for retaining the first end of the outer filter layer, and a second end cap for retaining the second end of the outer filter layer.

4. The filter assembly according to claim 1, wherein the inner filter assembly further includes a hollow cylindrical core having a side wall and defining a first end and a second end and the inner filter layer is disposed around an outside surface of the sidewall of the hollow cylindrical core.

5. The filter assembly according to claim 4, wherein the side wall of the inner filter assembly has a plurality of perforations defined therein.

6. The filter assembly according to claim 4, wherein the inner filter assembly further includes a first end cap disposed on the first end of the hollow cylindrical core and a second end cap disposed on the second end of the hollow cylindrical core.

7. The filter assembly according to claim 4, wherein the inner filter layer of meltblown polypropylene has a longitudinal length of 18 inches, an outer diameter of 4.5 inches, an annular thickness of 0.5 inches and a weight of 1.8 grams per square inch of lateral surface area.

8. The filter assembly according to claim 1, wherein
the outer filter layer of pleated polyester fabric is arranged in a hollow cylindrical shape and the outer filter assembly further includes a first end cap for retaining the first end of the outer filter layer, and a second end cap for retaining the second end of the outer filter layer,
the inner filter assembly includes a hollow cylindrical core having a side wall with a plurality of perforations defined therein and defining a first end and a second end, the inner filter layer being disposed around an outer surface of the side wall of the hollow cylindrical core, a first end cap disposed on the first end of the hollow cylindrical core, and a second end cap disposed on the second end of the hollow cylindrical core,
the inner filter assembly is removably received within the outer filter assembly such that the hollow cylindrical core and inner filter layer extend within the hollow cylindrical shape defined by the outer filter layer, such that the common flow path is a radial flow path extending from the outside of the outer filter layer to an interior of the hollow cylindrical core.

9. The filter assembly according to claim 8, wherein the inner filter layer of meltblown polypropylene has a longitudinal length of 18 inches, an outer diameter of 4.5 inches, an annular thickness of 0.5 inches and a weight of 1.8 grams per square inch of lateral surface area.

10. The filter assembly according to claim 8, wherein the second end cap of the inner filter assembly includes a beveled coupling surface along an inner diameter of the second end cap.

11. The filter assembly according to claim 8, wherein the second end cap of the outer filter assembly includes a recessed portion that receives the second end cap of the inner filter assembly in a mating engagement.

12. A spa tub, comprising:
a basin including a filtering chamber;
a circulation system including at least one inlet in fluid communication with the filtering chamber of the basin, at least one outlet in fluid communication with the basin and a circulation pump for circulating liquid from the at least one inlet to the at least one outlet; and
a filter assembly disposed within the filtering chamber of the basin and connected to the at least one inlet of the circulation system, the filter assembly comprising:
an outer filter assembly, the outer filter assembly including an outer filter layer of pleated polyester fabric defining a first end and a second end; and
an inner filter assembly, the inner filter assembly including an inner filter layer of meltblown polypropylene,
wherein the inner filter assembly is operably associated with the outer filter assembly such that the outer filter layer and the inner filter layer extend along a common flow path.

13. The spa tub according to claim 12, wherein
the outer filter layer of pleated polyester fabric is arranged in a hollow cylindrical shape and the outer filter assembly further includes a first end cap for retaining the first end of the outer filter layer, and a second end cap for retaining the second end of the outer filter layer, the inner filter assembly includes a hollow cylindrical core having a side wall with a plurality of perforations defined therein and defining a first end and a second end, the inner filter layer being disposed around an outer surface of the side wall of the hollow cylindrical core, a first end cap disposed on the first end of the hollow cylindrical core, and a second end cap disposed on the second end of the hollow cylindrical core, the inner filter assembly is removably received within the outer filter assembly such that the hollow cylindrical core and inner filter layer extend within the hollow cylindrical shape defined by the outer filter layer, such that the common flow path is a radial flow path extending from the outside of the outer filter layer to an interior of the hollow cylindrical core.

14. The spa tub according to claim 13, wherein the filter assembly is mounted in a horizontal orientation within the filtering chamber of the basin and the at least one inlet of the circulation system comprises two inlets connected to the first end cap of the outer filter assembly and the second end cap of the inner filter assembly.

15. The spa tub according to claim 13, wherein the inner filter layer of meltblown polypropylene has a longitudinal length of 18 inches, an outer diameter of 4.5 inches, an annular thickness of 0.5 inches and a weight of 1.8 grams per square inch of lateral surface area.

16. The spa tub according to claim 13, wherein the second end cap of the inner filter assembly includes a beveled coupling surface along an inner diameter of the second end cap.

17. The spa tub according to claim 13, wherein the second end cap of the outer filter assembly includes a recessed portion that receives the second end cap of the inner filter assembly in a mating engagement.

18. The spa tub according to claim 12, wherein the at least one outlet of the circulation system comprises at least one jet nozzle attached to the basin and at least one waterfall formed within the basin.

* * * * *